(12) United States Patent
Hamaguchi et al.

(10) Patent No.: US 8,009,527 B2
(45) Date of Patent: Aug. 30, 2011

(54) OPTICAL PICKUP DEVICE

(75) Inventors: Shinichi Hamaguchi, Hyogo (JP); Yuzo Shimizu, Osaka (JP); Daisuke Furukawa, Osaka (JP); Naoto Shimada, Hyogo (JP); Toshihiro Kuroda, Hyogo (JP); Toyonori Kusuhara, Osaka (JP); Hiroaki Yamamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 724 days.

(21) Appl. No.: 11/941,488

(22) Filed: Nov. 16, 2007

(65) Prior Publication Data

US 2008/0137516 A1    Jun. 12, 2008

(30) Foreign Application Priority Data

Dec. 8, 2006   (JP) ................................ 2006-332483

(51) Int. Cl.
*G11B 7/00* (2006.01)
(52) U.S. Cl. .................. 369/44.37; 369/44.41; 369/120
(58) Field of Classification Search ........................ None
See application file for complete search history.

(56) References Cited

U.S. PATENT DOCUMENTS

| | | | |
|---|---|---|---|
| 6,891,675 B2 | 5/2005 | Ohyama | |
| 6,928,035 B2 * | 8/2005 | Komma et al. | 369/44.37 |
| 7,180,837 B2 * | 2/2007 | Yi et al. | 369/44.37 |
| 7,247,826 B2 | 7/2007 | Hamaguchi et al. | |
| 7,313,061 B2 * | 12/2007 | Nishimoto et al. | 369/44.37 |
| 2005/0185539 A1 * | 8/2005 | Shimano et al. | 369/44.37 |
| 2006/0083146 A1 * | 4/2006 | Isshiki et al. | 369/112.03 |
| 2006/0237624 A1 | 10/2006 | Hamaguchi et al. | |

FOREIGN PATENT DOCUMENTS

| | | |
|---|---|---|
| JP | 2000-011433 | 1/2000 |
| JP | 2001-176119 | 6/2001 |
| JP | 2006-302456 | 11/2006 |

OTHER PUBLICATIONS

English language Abstract of JP 2001-176119.
U.S. Appl. No. 11/763,163 to Hamaguchi et al., which was filed on Jun. 14, 2007.

* cited by examiner

*Primary Examiner* — Hoa T Nguyen
*Assistant Examiner* — Emily Frank
(74) *Attorney, Agent, or Firm* — Greenblum & Bernstein, P.L.C.

(57) ABSTRACT

The optical pickup device according to the present invention includes: a light source which emits a first light at a first wavelength, a second light at a second wavelength and a third light at a third wavelength; an optical path combining unit which combines vectors of the first, second and third light emitted by the light source, and matches optical axes of the first light and the third light; a light collection unit which condenses the light from the optical path combining unit into the optical information storage medium; a diffraction element which diffracts reflected light from the optical information storage medium; a first photo detector, a second photo detector and a third photo detector which receives the diffracted light from the first diffraction element; and a prevention unit formed between the first diffraction element and the first photo detector, the second photo detector and the third photo detector, and which prevents irradiation of + first-order diffracted light diffracted by the first diffraction element into the first photo detector, the second photo detector, and the third photo detector.

14 Claims, 11 Drawing Sheets

PRIOR ART

— 405nm (First-order)
----- 405nm (Second-order)
—·— 650nm (First-order)
— — 780nm (First-order)

OPTICAL PICKUP DEVICE

BACKGROUND OF THE INVENTION (1) Field of the Invention

The present invention relates to an optical pickup device which records, reproduces and erases information on an optical information storage media such as an optical disc and an optical card.

(2) Description of the Related Art

For highly accurate/high capacity storage media, the range of products to which optical memory technology, which uses optical information storage media with a pit pattern, is applied has expanded to digital audio discs, video discs, document file discs, data files and so on. In optical memory technology, information is stored and reproduced with high accuracy and high reliability in an optical information storage medium using a minutely focused optical beam. These storage and playback processes depend entirely on an optical system. The basic functions of the optical pickup device, which is the main section of the optical system, are divided into: collecting which forms diffraction limit microspots, focus control in the optical system, tracking control for the optical system and detecting pit signals. These functions are realized via a combination of any type of optical system and a photoelectric conversion detection method according to the purpose and usage of the functions. In recent years, in order to miniaturize and make the optical pickup device thinner, a diffraction element (a hologram) is utilized (see for example, Patent Document 1, Japanese Patent Publication No. 2001-176119).

Figure 1:
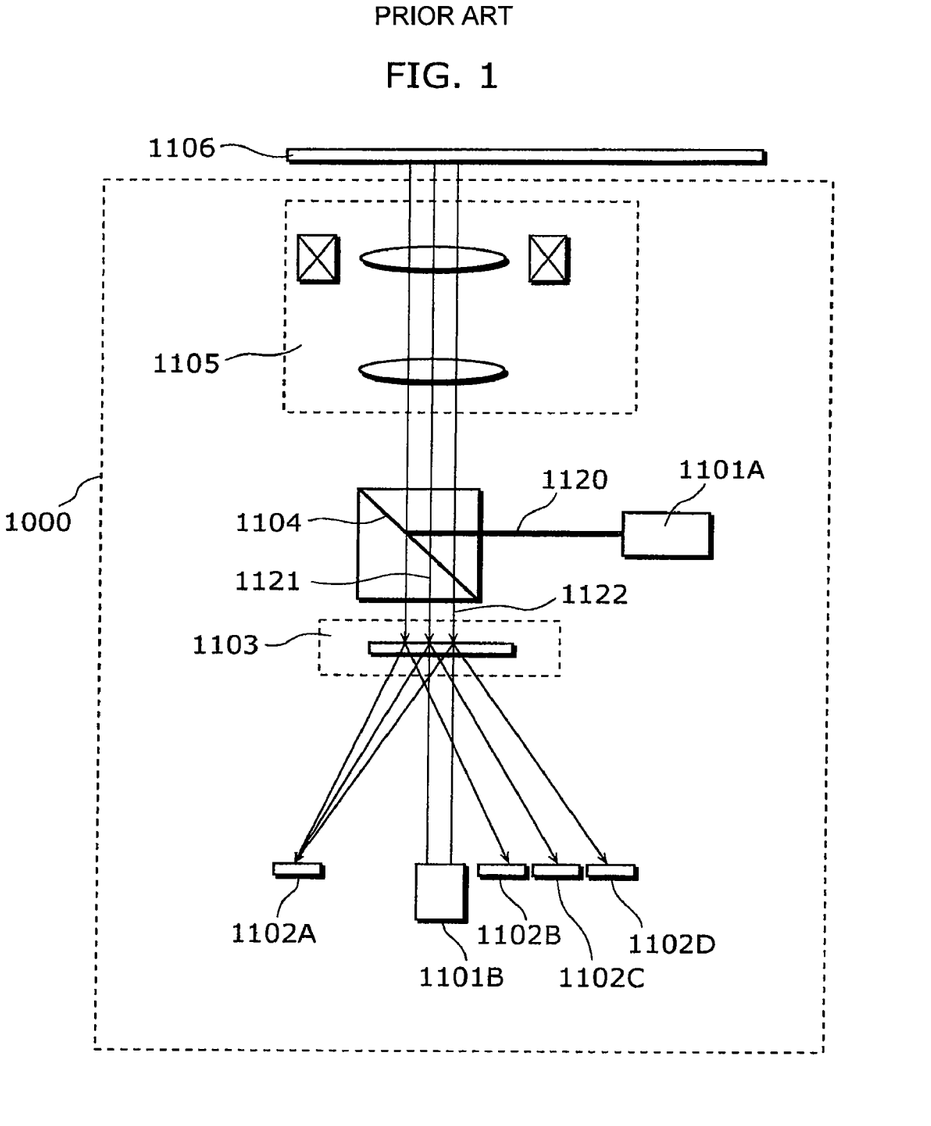
FIG. 1 is a diagram which shows the structure of a conventional optical pickup device.

FIG. 1 is a diagram which shows the structure of an optical pickup device which utilizes a conventional diffraction element. The optical pickup device 1000 shown in FIG. 1 records, reproduces and deletes information in the optical information storage medium 1106. For example, the optical information storage medium 1106 is a Compact Disc (CD), a Digital Versatile Disc (DVD), a Blu-ray Disc (BD) or a High Definition DVD (HD-DVD). The optical pickup device 1000 includes a light source 1101A and 1101B, photo detectors 1102A, 1102B, 1102C and 1102D, a diffraction element 1103, an optical path combining unit 1104 and a collection unit 1105.

The light source 1101A is a light source which emits a light at the first wavelength (for example, blue light) 1120, which is light at the first wavelength. The light source 1101B is a light source which emits a light at a second wavelength (for example, red light) 1121, which is light at a second wavelength, which is longer than the first wavelength, as well as a light at the third wavelength (for example, infrared light) 1122 which is light of a third wavelength longer than the second wavelength.

The light at the first wavelength 1120 emitted from the light source 1101A is reflected by the optical path combining unit 1104, collected by the collection unit 1105, irradiated onto the optical information storage medium 1106 and reflected by the optical information storage medium 1106. The light reflected by the optical information storage medium 1106 is collected by the collection unit 1105, passes through the optical path combining unit 1104, enters into the diffraction element 1103 and is diffracted such that the light enters into the photo detectors 1102A and 1102B.

The light at the second wavelength emitted from the light source 1101B is collected by the collection unit 1105, irradiated onto the optical information storage medium 1106 and reflected by the optical information storage medium 1106. The light reflected by the optical information storage medium 1106 is collected by the collection unit 1105, enters the diffraction element 1103, and is diffracted such that the light is selectively introduced into the photo detectors 1102A and 1102C. The light at the third wavelength 1122 emitted from the light source 1101B is collected by the collection unit 1105, irradiated onto the optical information storage medium 1106 and reflected by the optical information storage medium 1106. The light reflected by the optical information storage medium 1106 is collected by the collection unit 1105, enters the diffraction element 1103, and is diffracted such that the light is introduced selectively into the photo detectors 1102A and 1102D.

In other words, when the diffracted light on the right side of the diagram is defined by the diffraction element 1103 as – (minus), and the light diffracted on the left side as + (plus), then the + first-order diffracted light within the reflected light of the first through third wavelengths enters the photo detector 1102A. As for the – first-order diffracted light, diffracted light at the first wavelength enters the photo detector 1102B, diffracted light at the second wavelength enters the photo detector 1102C and diffracted light at the third wavelength enters the photo detector 1102D. A signal is outputted according to the amount of received light from the photo detectors 1102A through 1102D.

However, in a conventional optical pickup device 1000, since unnecessary diffracted light diffracted by the diffraction element 1103 enters the semiconductor board on which the photo detectors 1102A through 1102D are formed, there is the problem that stray light will be generated. The signal used for data storage, playback and deletion in the optical information storage medium 1106 deteriorates due to the stray light.

SUMMARY OF THE INVENTION

The present invention is realized in order to solve the problem above and has an object of providing an optical pickup device which stops the generation of stray light.

In order to achieve the object above, the optical pickup device according to the present invention is a optical pickup device which performs at least one of writing information in and reading information out of an optical information storage medium, the optical pickup device comprising: a light source which emits a first light at a first wavelength, a second light at a second wavelength and a third light at a third wavelength; an optical path combining unit which combines vectors of the first, second and third light emitted by the light source, and matches optical axes of the first light and the third light; a light collection unit which condenses the light from the optical path combining unit into the optical information storage medium; a first diffraction element which diffracts reflected light of the first light reflected from the optical information storage medium into + first-order diffracted light, – first-order diffracted light, + second-order diffracted light and – second-order diffracted light, and diffracts reflected light of the second light reflected from the optical information storage medium into the + first-order diffracted light and the – first-order diffracted light, and to diffract reflected light of the third light reflected from the optical information storage medium into the + first-order diffracted light and the – first-order diffracted light; a first photo detector which receives the + second-order diffracted light of the first light, the + first-order diffracted light of the second light and the + first-order diffracted light of the third light from the first diffraction element; a second photo detector which receives the – second-order diffracted light of the first light and the – first-order diffracted light of the third light from the first diffraction element; a third photo detector which receives the − first-order diffracted light of the second light from the first diffraction element; and a prevention unit formed between the first diffraction element and the first photo detector, the second photo detector and the third photo detector, and which prevents irradiation of the + first-order diffracted light and the − first-order diffracted light of the first light diffracted by the first diffraction element into the first photo detector, the second photo detector, and the third photo detector.

According to this configuration, the number of optical axes may be reduced from the conventional three optical axes to two optical axes. Thus, light usage efficiency can be improved since the number of optical axes divergent from the center of the collection unit can be reduced. Further, ± first-order diffracted light which is originally unnecessary can for example, be prevented from entering the semiconductor substrate on which the first through third optical detectors are formed. Thus, the generation of stray light due to ± first-order diffracted light can be stopped. Thus, deterioration of the signal utilized in storage, playback and deletion in the optical information storage medium due to stray light can be stopped.

Additionally, the prevention unit may include a first stray light reflection unit formed between the first diffraction element and the first photo detector, and which reflects the + first-order diffracted light of the first light diffracted by the first diffraction element; and a second stray light reflection unit formed between the first diffraction element, and the second photo detector and the third photo detector, and which reflects the − first-order diffracted light of the first light diffracted by the first diffraction element.

According to this configuration, ± first-order diffracted light of the first light is reflected by the first stray light reflection unit and the second stray light reflection unit. Thus, ± first-order diffracted light which is originally unnecessary can be stopped from becoming stray light. Thus, deterioration of the signal utilized in storage, playback and deletion in the optical information storage medium due to stray light can be stopped.

Additionally, the first stray light reflection unit and the second stray light reflection unit may be made up of Ti, Al, Au or Pt.

According to this configuration, since the first stray light reflection unit and the second stray light reflection unit are composed of commonly used materials in the production process of the optical element, the first stray light reflection unit and the second stray light reflection unit can be realized without increasing new materials.

Additionally, the first stray light reflection unit and the second stray light reflection unit may be made of $SiO_2$, $TiO_2$, SiN or MgF.

According to this configuration, since the first stray light reflection unit and the second stray light reflection unit are composed of commonly used materials in the production process of the optical element, the first stray light reflection unit and the second stray light reflection unit can be realized without increasing new materials.

Additionally, the first stray light reflection unit, the second stray light reflection unit and the first diffraction element may be laid out as a single optical element.

According to this structure, the number of parts can be reduced since it is possible to form the first diffraction element, the first stray light reflection unit and the second stray light reflection unit as a single optical element.

Additionally, the prevention unit may include: a first stray light absorption unit formed between the first diffraction element and the first photo detector, and which absorb + first-order diffracted light of the first light diffracted by the diffraction element; and a second stray light absorption unit formed between the first diffraction unit, and the second photo detector and the third photo detector, and which absorbs − first-order diffracted light of the first light diffracted by the first diffraction element.

According to this configuration, ± first-order diffracted light of the first light is absorbed by the first stray light reflection unit and the second stray light reflection unit. Thus, ± first-order diffracted light which is originally unnecessary can be stopped from becoming stray light. Thus, deterioration of the signal utilized in storage, playback and deletion in the optical information storage medium due to stray light can be stopped.

Additionally, the first stray light absorption unit and the second stray light absorption unit may be made of carbon black.

According to this structure, the number of parts can be reduced since it is possible to form the first diffraction element, the first stray light reflection unit and the second stray light reflection unit as a single optical element.

Additionally, the prevention unit may include: a second diffraction element formed between the first diffraction element and the first photo detector, and which diffracts the + first-order diffracted light of the first light diffracted by the first diffraction element; and a third diffraction element formed between the first diffraction element, and the second photo detector and the third photo detector, and which diffracts the − first-order diffracted light of the first light diffracted by the first diffraction element.

According to this configuration, ± first-order diffracted light of the first light is diffracted by the second diffraction element and the third diffraction element. Thus, ± first-order diffracted light which is originally unnecessary can be stopped from becoming stray light. Thus, deterioration of the signal utilized in storage, playback and deletion in the optical information storage medium due to stray light can be stopped. Further, the second diffraction element and the third diffraction element can be realized without adding new methods since the second diffraction element and the third diffraction element can be manufactured with the same process as the first diffraction element.

Additionally, the first stray light diffraction unit, the second diffraction element and the first diffraction element may be laid out as a single optical element.

According to this configuration, the number of parts can be reduced since it is possible to form the first diffraction element, the second diffraction element and the third diffraction element as a single optical element.

Additionally, the first light may be blue light, the second light may be red light and the third light may be infrared light.

According to this structure, for example, the generation of stray light can be stopped in an optical pickup device compatible with a BD (or HD-DVD) which utilizes blue light, and a DVD which uses infrared light and a CD which uses infrared light.

Additionally, the light source includes: a first light source which emits the first light; and a second light source which emits the second and the third light, the second light source, the first photo detector, the second photo detector and the third photo detector may be formed on the same substrate.

According to this configuration, by integrating the second light source and the first through third optical detectors, the installation space can be minimized. Thus, costs can be reduced for the optical pickup device.

Additionally, the cross-section structure of the first diffraction element may be a serrated shape.

According to this structure, for example, the grating depth of the peak of second-order diffraction efficiency for the first light at the first wavelength (wavelength 405 nm) and the first-order diffraction efficiency peak for the second light at the second wavelength (wavelength 650 nm) and the third light at the third wavelength (wavelength 780 nm) are at about the same position. Thus, the first light at the first wavelength (wavelength 405 nm), the second light at the second wavelength (wavelength 650 nm) and the third light at the third wavelength (wavelength 780 nm) can be easily detected in a single first photo detector.

Additionally, the optical combining unit may combine vectors of the first light, the second light and the third light by causing the first light to reflect.

The present invention can provide an optical pickup device which stops the generation of stray light.

FURTHER INFORMATION ABOUT TECHNICAL BACKGROUND TO THIS APPLICATION

The disclosure of Japanese Patent Application No. 2006-332483 filed on Dec. 8, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Below, an embodiment of the optical pickup device according to the present invention is explained in detail with reference to the diagrams.

First Embodiment

The optical pickup device according to the first embodiment of the present invention is an optical pickup device compatible with light of three wavelengths. The optical pickup device equalizes the optical axes of light at two wavelengths. Further, the optical pickup device according to the first embodiment of the present invention can stop the generation of stray light by including a stray light reflection unit which reflects unnecessary diffracted light diffracted by a diffraction element.

First, the structure of the optical pickup device according to the first embodiment of the present invention is explained.

Figure 2:
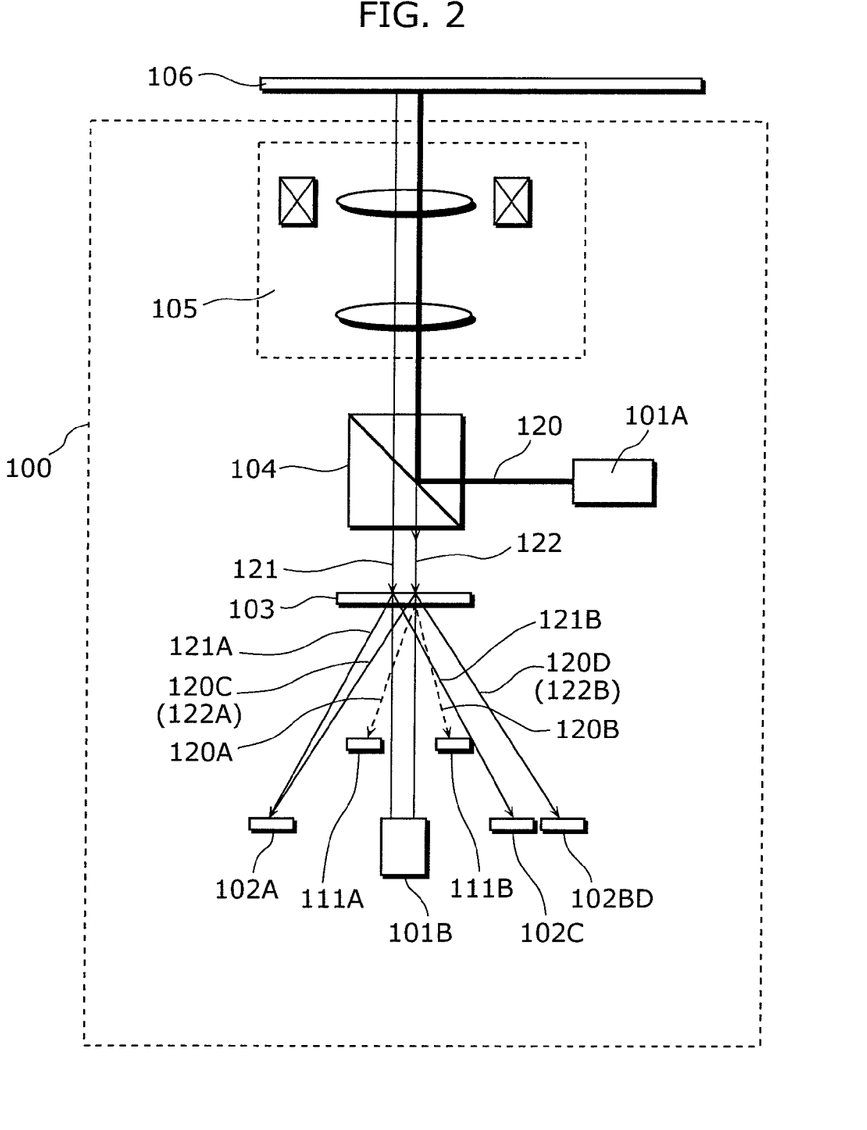
FIG. 2 is a diagram which shows a structure of the optical pickup device according to the first embodiment of the present invention.

FIG. 2 is a diagram which shows a conceptual structure of the optical pickup device according to the first embodiment of the present invention.

The optical pickup device 100 shown in FIG. 2 stores, reproduces and deletes information in an optical information storage medium 106. The optical pickup device 100 includes light sources 101A and 101B, a photo detector 102A, 102BD and 102C, a diffraction element 103, an optical path combining unit 104, a collection unit 105, and stray light reflection units 111A and 111B.

The optical pickup device 100 according to the first embodiment of the present invention differs from a conventional optical pickup device 1000 in that the optical path combining unit 104 nearly matches the optical axes of light at the first wavelength and of light at the third wavelength, and in that the optical pickup device 100 includes the stray light reflection regions 111A and 111B.

The light source 101A is a light source which emits a light at the first wavelength 120, which is light at the first wavelength. The light source 101B is a light source which emits a light at the second wavelength 121 which is a light at a second wavelength longer than the first wavelength, and a light at the third wavelength 122 which is a light at a third wavelength longer than the second wavelength. The first wavelength is for example 405 nm (blue light) for BD or HD-DVD, the second wavelength is for example 650 nm (red light) for DVD and the third wavelength is for example 780 nm (infrared light) for CD. Also, the light sources 101A and 101B are for example semiconductor lasers.

The photo detectors 102A, 102C and 102BD output signals according to the amount of received light. For example, the photo detectors 102A, 102C and 102BD are photo detector diodes formed on an identical semiconductor (Si) substrate. Note that when the photo detectors 102A, 102C and 102BD are not specifically differentiated, they are described as a photo detector 102.

The diffraction element 103 diffracts reflected light from an optical information storage device 106. When the light diffracted to the right side of the diagram by the diffraction element 103 is defined as − (minus), and the light diffracted to the left side as + (plus), then the diffraction element 103 diffracts reflected light of the light at the first wavelength 120 into + first-order diffracted light 120A, − first-order diffracted light 120B, + second-order diffracted light 120C and − second-order diffracted light 120D. The diffraction element 103 diffracts reflected light of the light at the second wavelength 121 into + first-order diffracted light 121A and − first-order diffracted light 121B. The diffraction element 103 diffracts reflected light of the light at the third wavelength 122 into + first-order diffracted light 122A and − first-order diffracted light 122B. The diffraction element 103 is for example a hologram element.

The optical path combining unit 104 combines the vectors of light at the first, second and third wavelengths emitted by the light sources 101A and 101B. For example, the optical path combining unit 104 combines the vectors of light at the first wavelength 120, light at the second wavelength 121 and light at the third wavelength 122 by reflecting light of the light at the first wavelength 120. The optical path combining unit 104 matches the optical axes of light at the first wavelength and light at the third wavelength. The optical path combining unit 104 is for example a polarized light beam splitter. The optical path combining unit 104 causes light at the first wavelength (405 nm) to reflect or pass according to the polarized light direction.

The collection unit 105 collects light from the optical path combining unit 104 in the optical information storage media 106. The collection unit 105 is for example an actuator which includes a collimator lens and an objective lens.

The stray light reflection units 111A and 111B are formed between the diffraction element 103 and the photo detector 102. The stray light reflection units 111A and 111B prevents the + first-order diffracted light 120A and the − first-order diffracted light 120B of the light at the first wavelength diffracted by the diffraction element 103 from being irradiated in the direction of the photo detector 102. The stray light reflection unit 111A is formed at the position in which + first-order diffracted light 120A of the light at the first wavelength is inputted. The stray light reflection unit 111B is formed at the position in which the − first-order diffracted light 120B at the light at the first wavelength is inputted. The stray light reflection units 111A and 111B reflect irradiated light. In other words, the stray light reflection unit 111A is formed between the diffraction element 103 and the photo detector 102A and reflects + first-order diffraction light of the light at the first wavelength diffracted by the diffraction element 103. The stray light reflection unit 111B is formed between the diffraction element 103 and the photo detector 102C, and reflects − first-order diffracted light 120B of light at the first wavelength diffracted by the diffraction element 103. Note that when the stray light reflection units 111A and 111B are not specifically differentiated, the stray light reflection unit is described as the stray light reflection unit 111. For example, the stray light reflection unit 111 is made up of metals such as Ti, Al, Au or Pt. Otherwise, the stray light reflection unit 111 is composed of a monolayer conductor film made of $SiO_2$, $TiO_2$, SiN or MgF and the like, or a multi-layered conductor film with layers made up of $SiO_2$, $TiO_2$, SiN, MgF and the like.

Between the set position of the light source 101B and the set position of the optical information storage media 106, a diffusion element 103, an optical path combining unit 104 and a collection unit 105 are laid out in order starting from the side of the light source 101B. The light source 101A is laid out such that light may be directly emitted towards the optical path combining unit 104. The photo detector 102 and the stray light reflection area 111 are laid out on one end of the diffraction element 103 (the opposite direction of the direction in which the optical path combining unit 104 is laid out).

Next, the operations of the optical pickup device 100 are explained.

The light emitted from the light source 101A is reflected by the optical path combining unit 104, collected by the collection unit 105, irradiated onto the optical information storage medium 106 and reflected by the optical information storage medium 106. The reflected light reflected by the optical information storage medium 106 is collected by the collection unit 105, passes through the optical path combining unit 104, enters into the diffraction element 103 and is diffracted so as to be selectively enter into one of the photo detectors 102.

The light emitted from the light source 101B passes through the diffraction element 103 and the optical path combining unit 104, is collected by the collection unit 105, irradiated onto the optical information storage medium 106 and reflected by the optical information storage medium 106. The reflected light reflected by the optical information storage medium 106 is collected by the collection unit 105, passes through the optical path combining unit 104, enters into the diffraction element 103 and is diffracted so as to be selectively enter into one of the photo detectors 102.

When light diffracted by the diffraction element 103, which is made up of + second-order diffracted light 120C of the light at the first wavelength, + first-order diffracted light 121A of the light at the second wavelength and + first-order diffracted light of the light at the third wavelength entering the photo detector 102A. − second-order diffracted light 120D of the light at the first wavelength and − first-order diffracted light 122B at the light at the third wavelength enter into the photo detector 102BD. − first-order diffracted light at the second wavelength 121B enters into the photo detector 102C.

Also, the stray light reflection unit 111 reflects the unused + first-order diffracted light 120A and the − first-order diffracted light 120B of the light at the first wavelength as a signal light generated by the diffraction element 103. Thus, the generation of stray light in the substrate (a carrier generated by unused light) can be stopped by introducing the + first-order diffracted light 120A and the − first-order diffracted light 120B of the light at the first wavelength into the semiconductor substrate on which the photo detector 102 is formed.

Note that detection of both plus and minus diffracted light for light of each wavelength is performed in the conventional art, this is because a signal is generated for turning on a focus servo such that both optical spot sizes are fixed on both photo detectors for vertical movement of the optical information storage medium 106.

Thus, the curvature of the diffraction element is held such that the focal point of one part of the diffracted light is on the underside of a single photo detector (here, the photo detector 102A) and a focal point of another part of the diffracted light is on the upper side of plural photo detectors (here, the photo detectors 102C and 102BD) in the diffraction element 103. For example, the photo detector 102 preferably uses a reflection prevention film formed for wavelengths of 405 nm, 650 nm and 780 nm on the surface of the photo detector 102.

Figure 3:
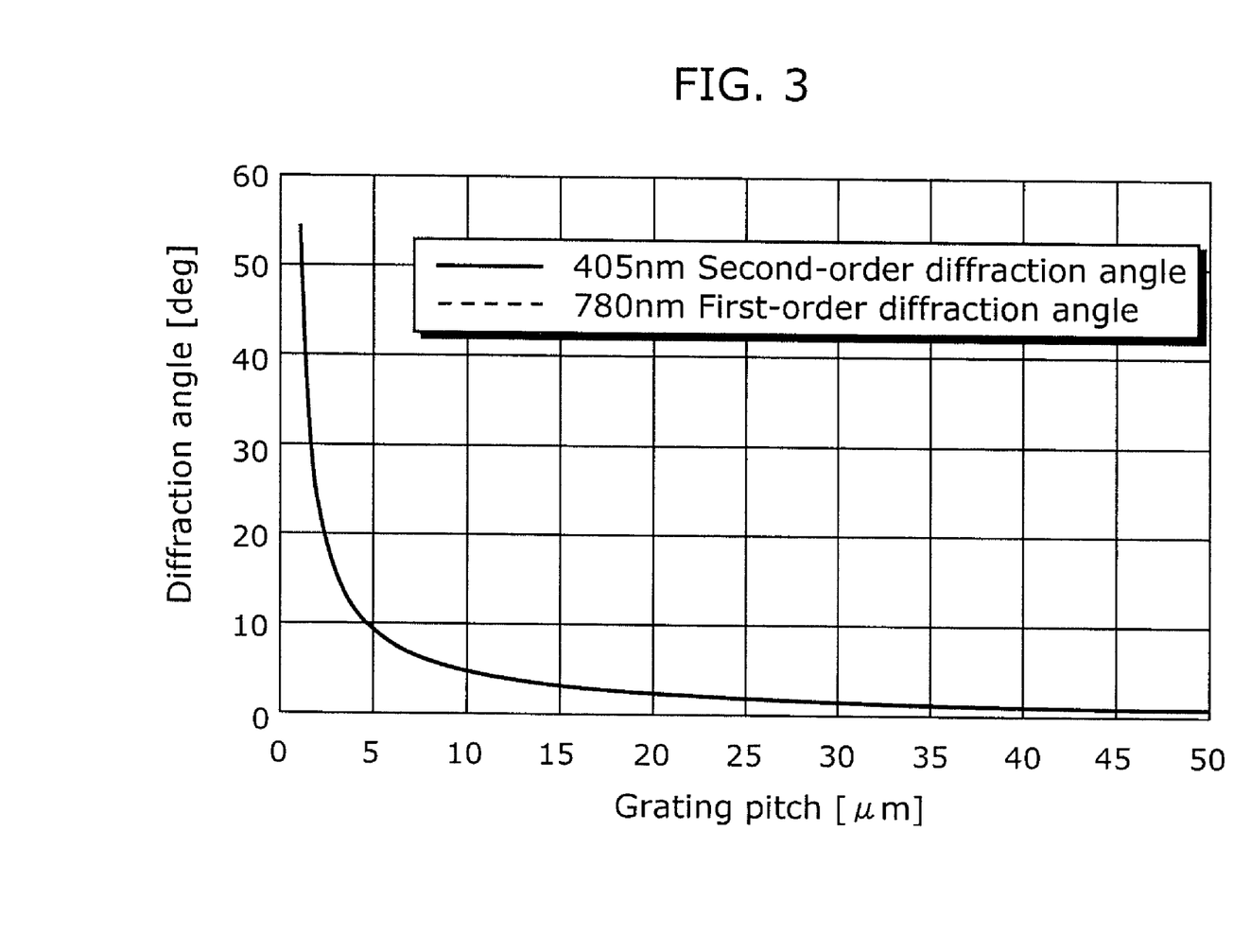
FIG. 3 is a diagram which shows the relationship between the grating pitch and the diffraction angle of the second order diffraction light at the first wavelength and the first order diffraction light at the third wavelength.

FIG. 3 is a diagram which shows the relationship between the grating pitch and the diffraction angle for the second-order diffracted light of the light at the first wavelength (wavelength 405 nm) and the first-order diffracted light of the third wavelength (wavelength 780 nm) light respectively. As shown in FIG. 3, the second-order diffracted light of the light at the first wavelength and the first-order diffracted light of the light at the third wavelength are diffraction angles with approximately the same value for each value of the grating pitch. Using this quality, the – second-order diffracted light 120D of the light at the first wavelength and the – first-order diffracted light 122B of the light at the third wavelength as described above can be detected with one photo detector 102BD. Normally, it is adequate for (the second diffraction angle of light at the first wavelength)–(the first diffraction angle of light at the third wavelength) to be within 2 degrees.

Figure 4A:
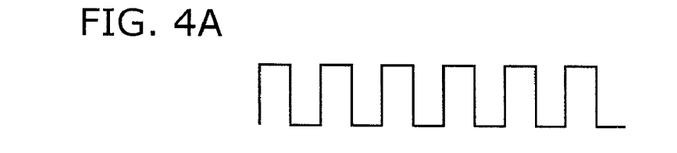
FIG. 4A is a diagram which shows a cross-section structure of the lattice shape used in the diffraction element.
Figure 4B:
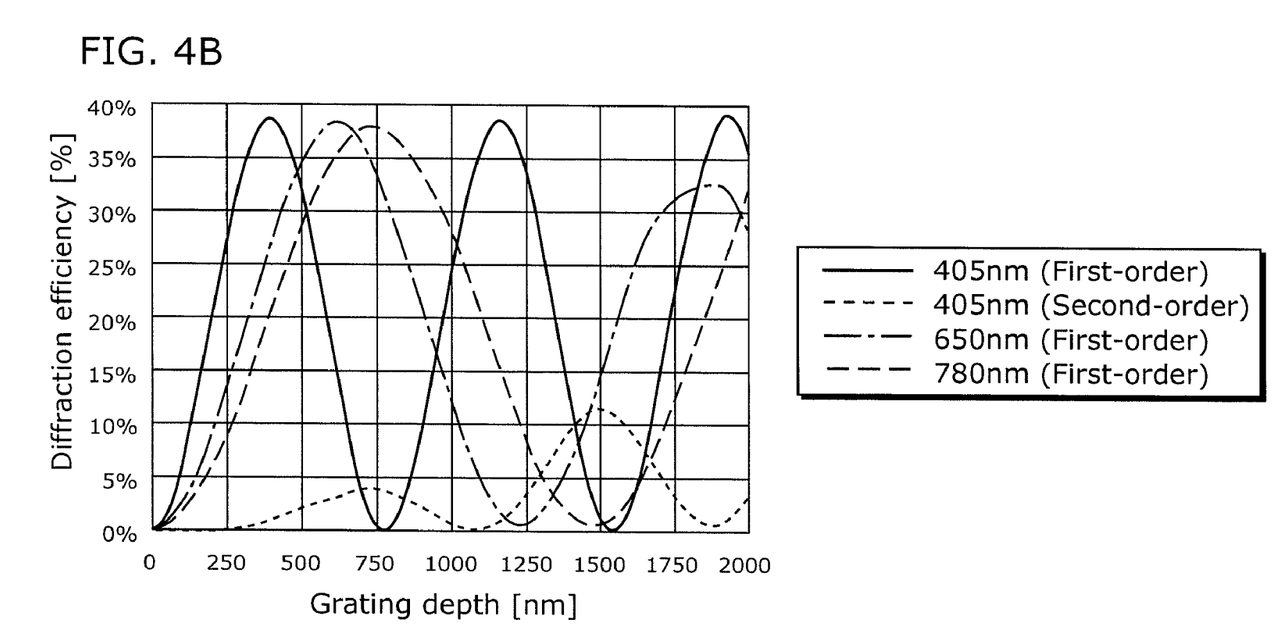
FIG. 4B is a diagram which shows the relationship between the grating depth and the diffraction efficiency.
Figure 5A:
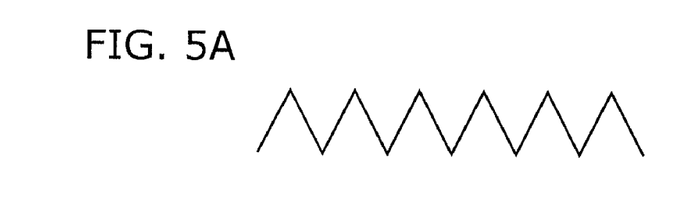
FIG. 5A is a diagram which shows a cross-section structure of the lattice shape used in the diffraction element.
Figure 5B:
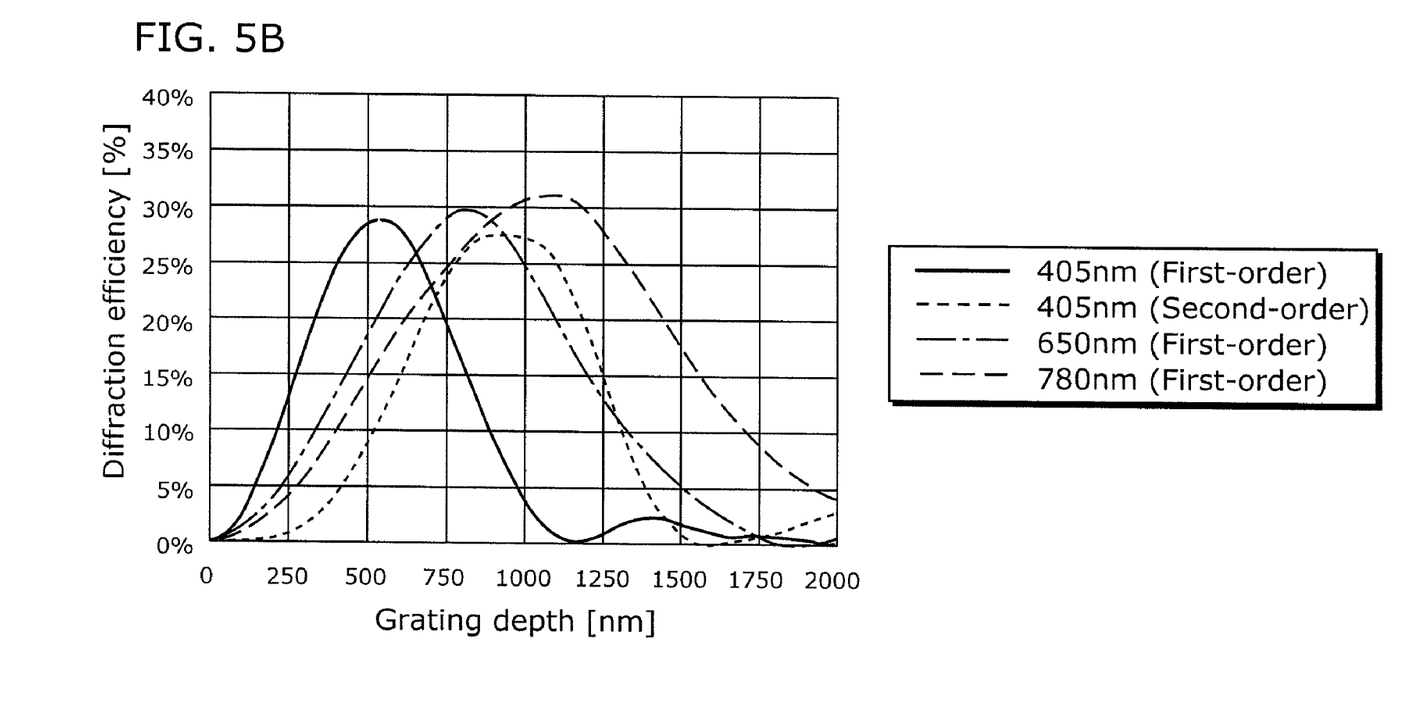
FIG. 5B is a diagram which shows the relationship between the grating depth and the diffraction efficiency.

FIG. 4A and FIG. 5A are diagrams which show a cross-section structure of the lattice shape used in the diffraction element 103. FIGS. 4B and 5B are diagrams which show the relationship between grating depth and diffraction efficiency. FIG. 4A is a diagram which typically shows the cross-section structure of a rectangular lattice shape. FIG. 4B is a diagram which shows the relationship between grating depth and diffraction efficiency in the rectangular lattice shape. Note that the diffraction element 103 has an index of diffraction of 1.52 and lattice intervals of 2.5 μm.

As shown in FIG. 4A, when the cross-section shape of the diffraction element is a binary shape, in other words when rectangles are lined up on one side in a concavoconvex shape, a peak in the second-order diffraction efficiency of the light at the first wavelength (wavelength 405 nm) and a peak in the first-order diffraction efficiency at the second wavelength (wavelength 650 nm) light and at the third wavelength (wavelength 780 nm) light appear at a position with a different grating depth, as shown in FIG. 4B.

FIG. 5A is a diagram which typically shows the cross-section structure of a serrated lattice shape. FIG. 5B is a diagram which shows the relationship between grating depth and diffraction efficiency in the serrated lattice shape. Note that the diffraction element 103 has an index of diffraction of 1.52 and lattice intervals of 2.5 μm.

As shown in FIG. 5A, when the cross section shape of the diffraction element is a serrated wave shape, in other words triangles lined up on one side in a concavoconvex shape; the peak for the second-order diffraction efficiency of the first wavelength (wavelength 405 nm) light and the peak for the first-order diffraction efficiency of the second wavelength (wavelength 650 nm) light and the third wavelength (wavelength 780 nm) light appear at positions with approximately the same grating depth. In other words, around the depth at which the peak of the second-order diffraction efficiency at the first wavelength appears, the first-order diffraction efficiency of the light at the second wavelength and the light at the third wavelength increases sufficiently. Thus, the first wavelength (wavelength 405 nm), the second wavelength (wavelength 650 nm) and the third wavelength (wavelength 780 nm) can be easily detected by a single photo detector 102A.

Accordingly, by using the serrated diffraction element 103, as shown in FIG. 5A, the optical pickup device 100 in the present invention which uses diffracted light from the diffraction element 103, can easily detect light of the light at the first wavelength, at the second wavelength and light at the third wavelength with a single photo detector 102A.

Note that in the embodiment above, the diffraction element 103 is laid out between the light source 101B and the optical path combining unit 104, however the same effect can be obtained between the optical path combining unit 104 and the collection unit 105, or inside the collection unit 105, between the collection unit 105 and the optical information storage medium 106.

Also, in the above embodiment, the diffraction element 103 and the stray light reflection unit 111 are laid out separately, however the same effect can be obtained by using the optical element in which the diffraction element 103 and the stray light reflection unit 111 are laid out on the top and bottom layer respectively.

Figure 6A:
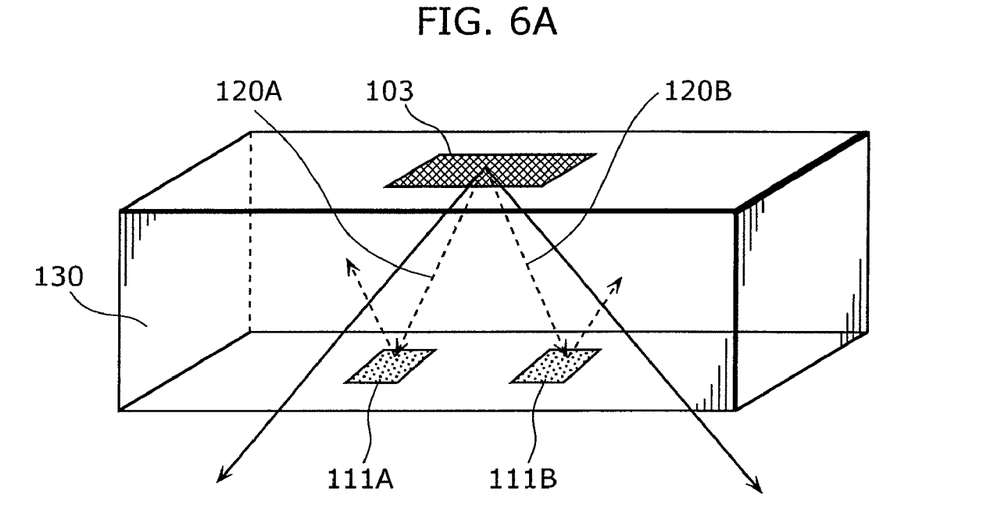
FIG. 6A is a diagonal view diagram which shows the structure of optical elements in the optical pickup device according to the first embodiment of the present invention.

FIG. 6A is a diagonal view diagram which shows the structure of an optical element 130 in which the diffraction element 103 and the stray light reflection unit 111 are laid out on the top and bottom layer of the optical element 130 respectively. As shown in FIG. 6A, the optical element 130 in which the diffraction element 103 and the stray light reflection unit 111 are laid out on the top and bottom layers respectively may be used. Thus, the amount of parts in the optical pickup device 100 can be reduced.

Figure 6B:
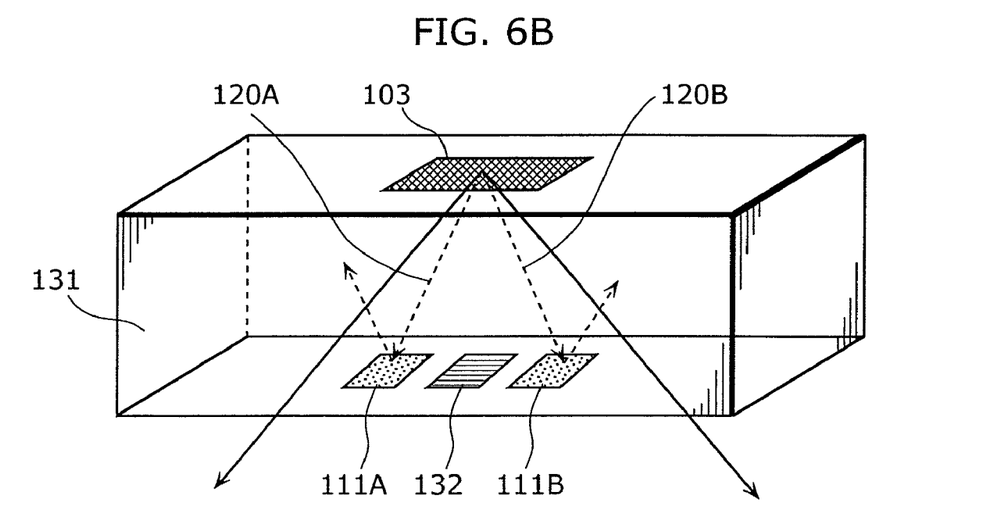
FIG. 6B is a diagonal view diagram which shows the modified structure of optical elements in the optical pickup device according to the first embodiment of the present invention.

Further, the diffraction element may be included between the stray light reflection unit 111A and the stray light reflection unit 111B. FIG. 6B is a diagonal view diagram which shows the structure of the optical element which includes the diffraction element between the stray light reflection unit 111A and the stray light reflection unit 111B. The optical element 131 shown in FIG. 6B further includes, in addition to the structure of the optical element 130 shown in FIG. 6A, a diffraction element 132. The diffraction element 132 generates a zero-order diffracted light of the light at the second wavelength 121 (wavelength 650 nm) and the light at the third wavelength 122 (wavelength 780 nm). For example, the zero-order diffracted light and the ± first-order diffracted light of the light at the second wavelength 121 and the light at the third wavelength 122 diffracted by the diffraction element 132 is irradiated onto the optical information storage medium 106. The reflected light (signal light) of the zero-order diffracted light and the ± first-order diffracted light at the second wavelength 121 and the light at the third wavelength 122 can be used as a tracking control signal. Thus, a three-beam push/pull method and a three-beam method which is a tracking servo in a DVD and a CD can be responded to.

Figure 7A:
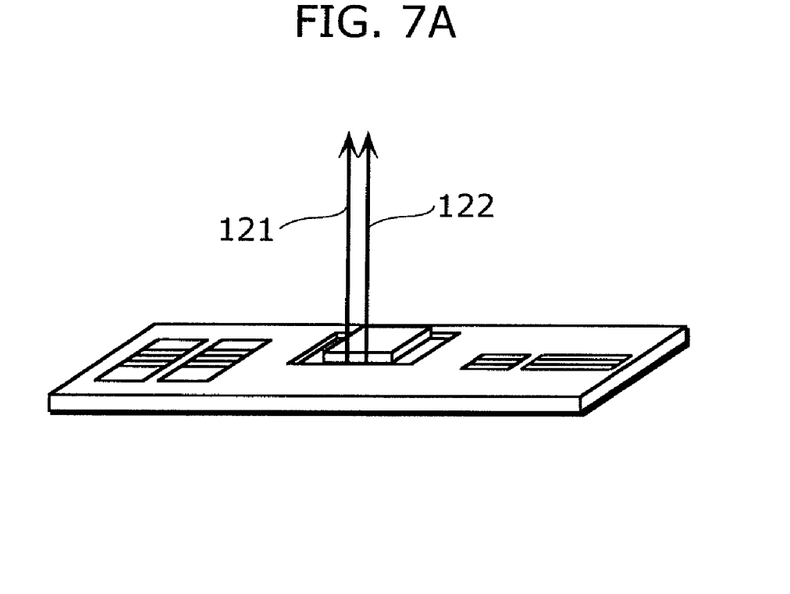
FIG. 7A is a diagonal view diagram which shows the structure of the light source and the photo detector in the optical pickup device according to the first embodiment of the present invention.
Figure 7B:
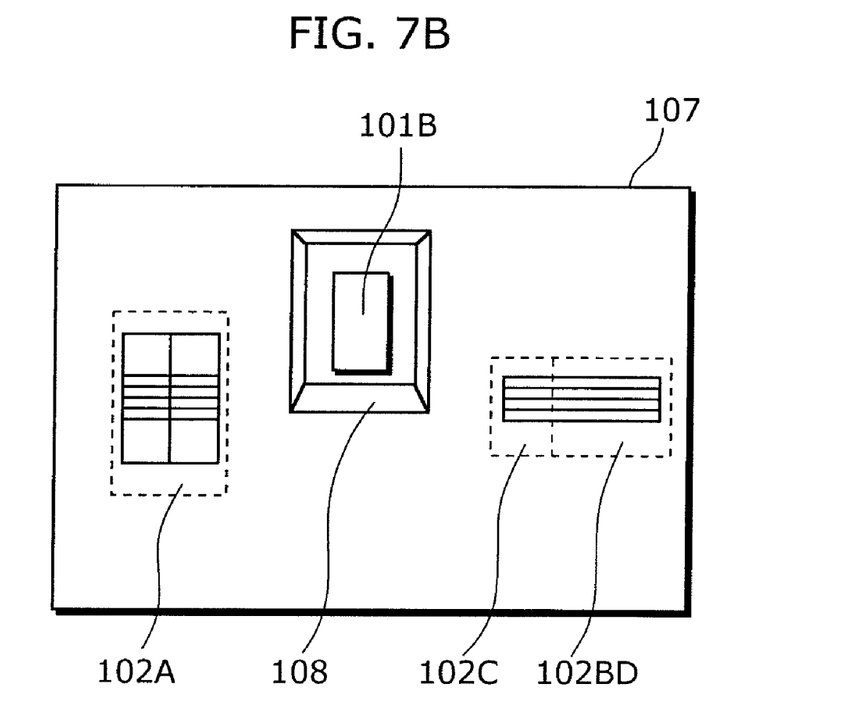
FIG. 7B is a plane diagram which shows the structure of the light source and the photo detector in the optical pickup device according to the first embodiment of the present invention.

Also, in the embodiment above, although the light source 101B and the photo detector 102 are laid out separately, the same effect can be obtained when the light source 101B and the photo detector 102 are used as a single integrated unit. FIG. 7A is a diagonal view diagram of the integrated unit of the light source 101B and the photo detector 102. FIG. 7B is a plane diagram of the integrated unit of the light source 101B and the photo detector 102. As shown in FIG. 7A and FIG. 7B, the photo detectors 102 (102A, 102C and 102BD) and the light source 101B are formed on the same substrate 107. Also, a light at the second wavelength 121 and a light at the third wavelength 122 are emitted from the light source 101B, reflected by a micro mirror 108 and emitted vertically.

Additionally, in the above embodiment, the light source 101A emits light at the first wavelength 120, and the light source 101B emits light of the light at the second wavelength 121 and light of the light at the third wavelength 122, however the light source 101A may emit light of the light at the third wavelength 122 and the light source 101B may emit light of the light at the first wavelength 120 and light at the second wavelength 121. Further, the light source 101A emits light at the first wavelength 120 (or the light at the third wavelength 122) and light at the second wavelength 121, and the light source 101B may emit light of the third wavelength 122 (or light at the first wavelength 120).

It follows from the above that the optical pickup device 100 according to the first embodiment of the present invention matches the optical axis of light at the first wavelength, which is the minimal wavelength, with the optical axis light at the third wavelength, which is the maximum wavelength. Thus, the number of optical axes can be reduced from the conventional three optical axes to two optical axes. Thus, the usage efficiency of light can be improved since the number of optical axes apart from the center of the collection unit 105 can be reduced.

Further, the optical pickup device 100 according to the first embodiment of the present invention includes a stray light reflection unit 111. Thus, the generation of stray light within the substrate (a carrier generated by unnecessary light) which occurs when the + first-order diffracted light 120A and the − first-order diffracted light 120B of the light at the first wavelength, which are generated by the diffraction element 103 and not used as a signal light, enter the semiconductor substrate formed by the photo detectors 102, can be reduced. Thus, the deterioration of the signal used in storage, playback and deletion in the optical information storage medium by the stray light can be stopped.

Additionally, the stray light reflection unit 111 is made up of metals such as Ti, Al, Au or Pt. Otherwise, the stray light reflection unit 111 is composed of a monolayer conductor film made up of $SiO_2$, $TiO_2$, SiN or MgF and the like, or a multi-layered conductor film with layers made up of $SiO_2$, $TiO_2$, SiN, MgF and the like. In other words, the stray light reflection areas 111 can be realized without adding new materials since the stray light reflection unit 111 are composed of materials generally used in the manufacturing process for optical elements.

Additionally, the optical path combining unit 104 has the function of reflecting or causing light at the first wavelength (405 nm) to pass according to the polarized direction. Thus, the usage efficiency of light can be further increased.

Additionally, the diffraction element 103 has a serrated cross section shape. The peak of the second-order diffraction efficiency for light at the first wavelength (wavelength 405 nm), and the peak of the first-order diffraction efficiency at the second wavelength (wavelength 650 nm) and the third wavelength (wavelength 780 nm) appears at approximately the same position as the grating depth. Thus, the first wavelength (wavelength 405 nm), the second wavelength (wavelength 650 nm) and the third wavelength (wavelength 780 nm) light can be easily detected by a single photo detector 102A.

Second Embodiment

The optical pickup according to the second embodiment can stop the generation of stray light by including a stray light absorption unit which absorbs unnecessary diffracted light diffracted by the diffraction element.

Figure 8:
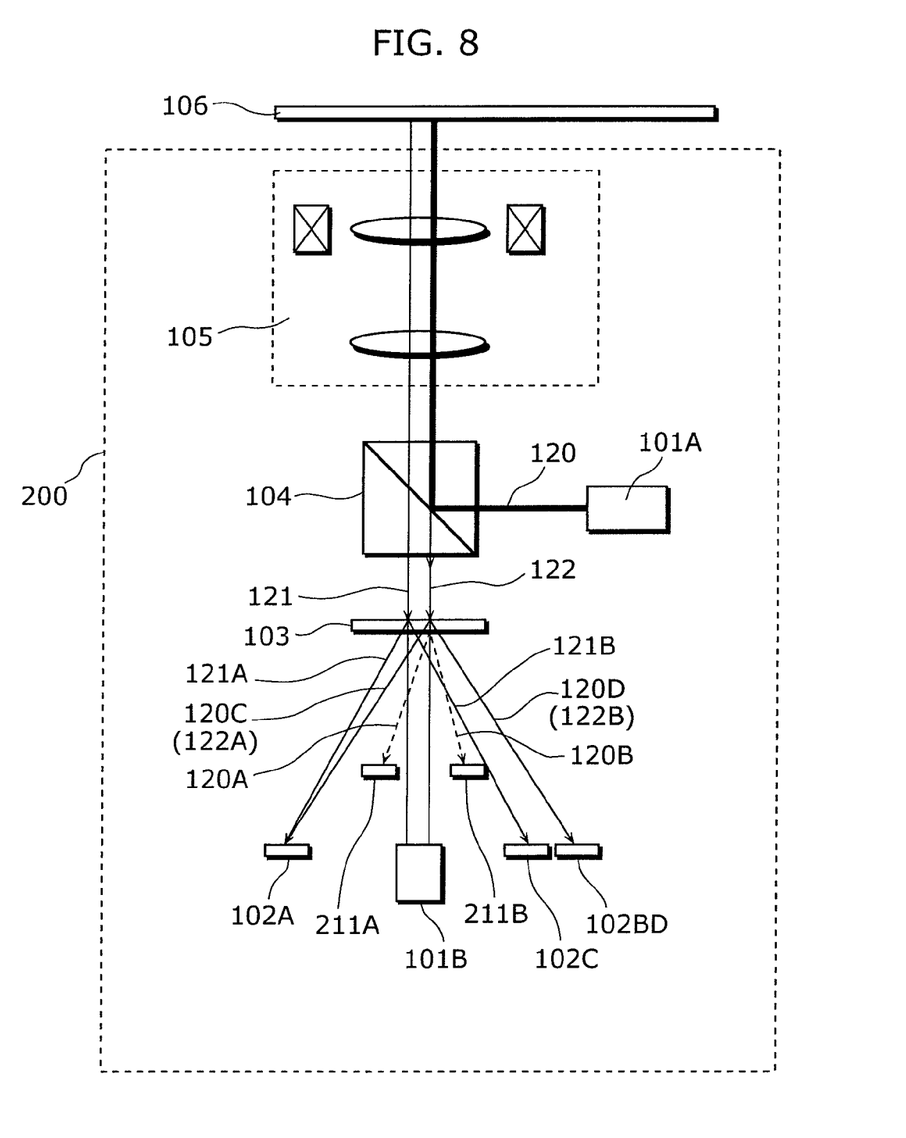
FIG. 8 is a diagram which shows the structure of the optical pickup device according to the second embodiment of the present invention.

FIG. 8 is a diagram which shows a conceptual structure of the optical pickup device according to the second embodiment of the present invention. Note that the same numbers are attached to the units as in FIG. 2 and a detailed description is not repeated.

The optical pickup device 200 shown in FIG. 8 records, plays back and deletes information in the optical information storage medium 106. The optical pickup device 200 includes the light sources 101A, the photo detector 102A, 101B, 102BD and 102C, the diffraction element 103, the optical route combining unit 104, the collection unit 105 and stray light absorption units 211A and 211B.

The stray light absorption units 211A and 211B are formed between the diffraction element 103 and the photo detector 102. The stray light absorption unit 211A and 211B prevent irradiation of the + first-order diffracted light 120A and the − first-order diffracted light 120B of the light at the first wavelength, which are diffracted by the diffraction element 103, in the direction of the photo detector 102. The stray light absorption unit 211A is formed at the position at which + first-order diffracted light 120A of the light at the first wavelength enters. The stray light absorption unit 211B is formed at the position at which − first-order diffracted light 120A at the first wavelength enters. The stray light absorption unit 211A and 211B absorb irradiated light. In other words, the stray light absorption unit 211A is formed between the diffraction element 103 and the photo detector 102A and absorbs the + first-order diffracted light 120A of the light at the first wavelength diffracted by the diffraction element 103. The stray light absorption unit 211B is formed between the diffraction element 103 and the photo detector 102C and absorbs the − first-order diffracted light at the first wavelength diffracted by the diffraction element 103. Note that when the stray light absorption units 211A and 211B are not specifically differentiated, the stray light absorption unit is described as the stray light absorption unit 211. For example the stray light absorption unit 211 is made of carbon black.

It follows from the above that the optical pickup device 200 according to the second embodiment of the present invention includes a stray light absorption unit 211. Thus, the generation of stray light within the substrate (carriers generated by unnecessary light), which occurs when the + first-order diffracted light 120A and the − first-order diffracted light 120B at the first wavelength, which are generated by the diffraction element 103 and not used as a signal light, enter the substrate formed by the photo detectors 102, can be reduced. Thus, the deterioration of the signal used in storage, playback and deletion by the optical information storage medium by the stray light can be stopped.

Also, in the embodiment described above, although the diffraction element 103 and the stray light absorption unit 211 are laid out separately, the same effect can be obtained when the diffraction element 103 and the stray light absorption unit 211 are used as an optical element in which the diffraction element 103 and the stray light absorption unit 211 are laid out on the top and bottom layer.

Figure 9A:
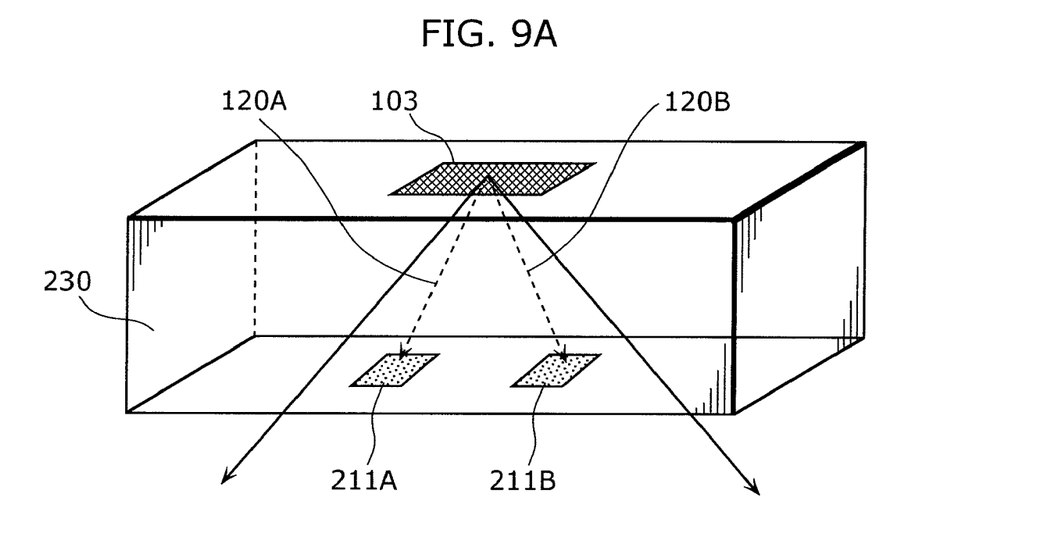
FIG. 9A is a diagonal view diagram which shows the structure of optical elements in the optical pickup device according to the second embodiment of the present invention.

FIG. 9A is a diagonal view diagram which shows the structure of an optical element 230 in which the diffraction element 103 and the stray light absorption unit 211 are laid out on the top and bottom layer. As shown in FIG. 9A, the optical element 230 in which the diffraction element 103 and the stray light absorption unit 211 are laid out on the top and bottom layers may be used. Thus, the amount of parts in the optical pickup device 200 can be reduced.

Figure 9B:
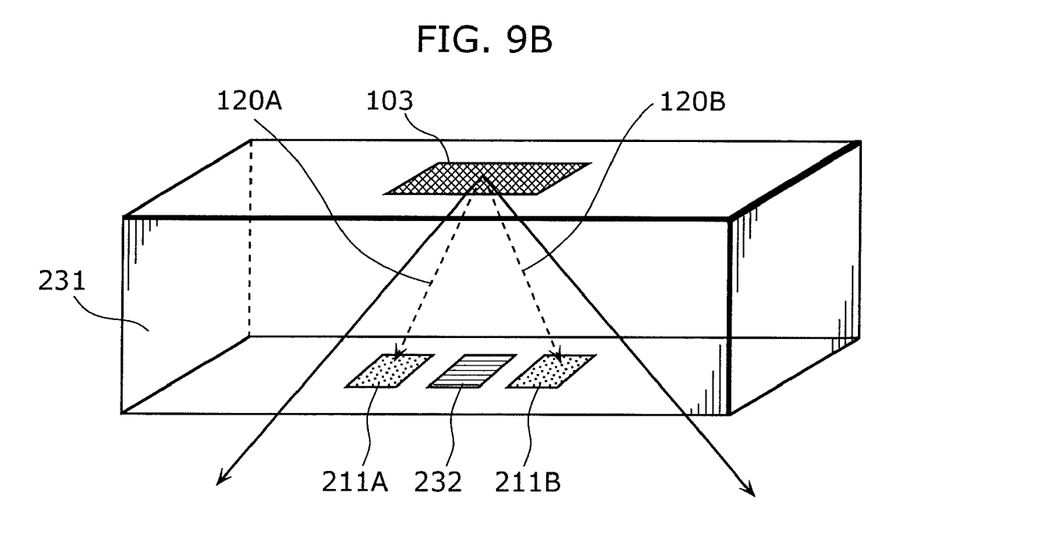
FIG. 9B is a diagonal view diagram which shows the modified structure of optical elements in the optical pickup device according to the second embodiment of the present invention.

Further, the diffraction element may be included between the stray light absorption unit 211A and the stray light absorption unit 211B. FIG. 9B is a diagonal view diagram which shows the structure of the optical element which includes the diffraction element between the stray light absorption unit 211A and the stray light absorption unit 211B. The optical element 231 shown in FIG. 9B further includes, in addition to the structure of the optical element 230 shown in FIG. 9A, a diffraction element 232. The diffraction element 232 generates a zero-order diffracted light and a ± first-order diffracted light at the second wavelength 121 (wavelength 650 nm) and the third wavelength 122 (wavelength 780 nm). For example, the zero-order diffracted light and the ± first-order diffracted light of the light at the second wavelength 121 and the light at the third wavelength 122 diffracted by the diffraction element 232 are irradiated onto the optical information storage medium 106. The reflected light (signal light) of the zero-order diffracted light and the ± first-order diffracted light of the light at the second wavelength 121 and the light at the third wavelength 122 can be used as a tracking control signal. Thus, a three-beam push/pull method and a three-beam method which is a tracking servo in a DVD and a CD are utilized.

Third Embodiment

The optical pickup device according to the third embodiment can stop the generation of stray light by including a stray light diffraction unit which diffracts unnecessary diffracted light diffracted by the diffraction element.

Figure 10:
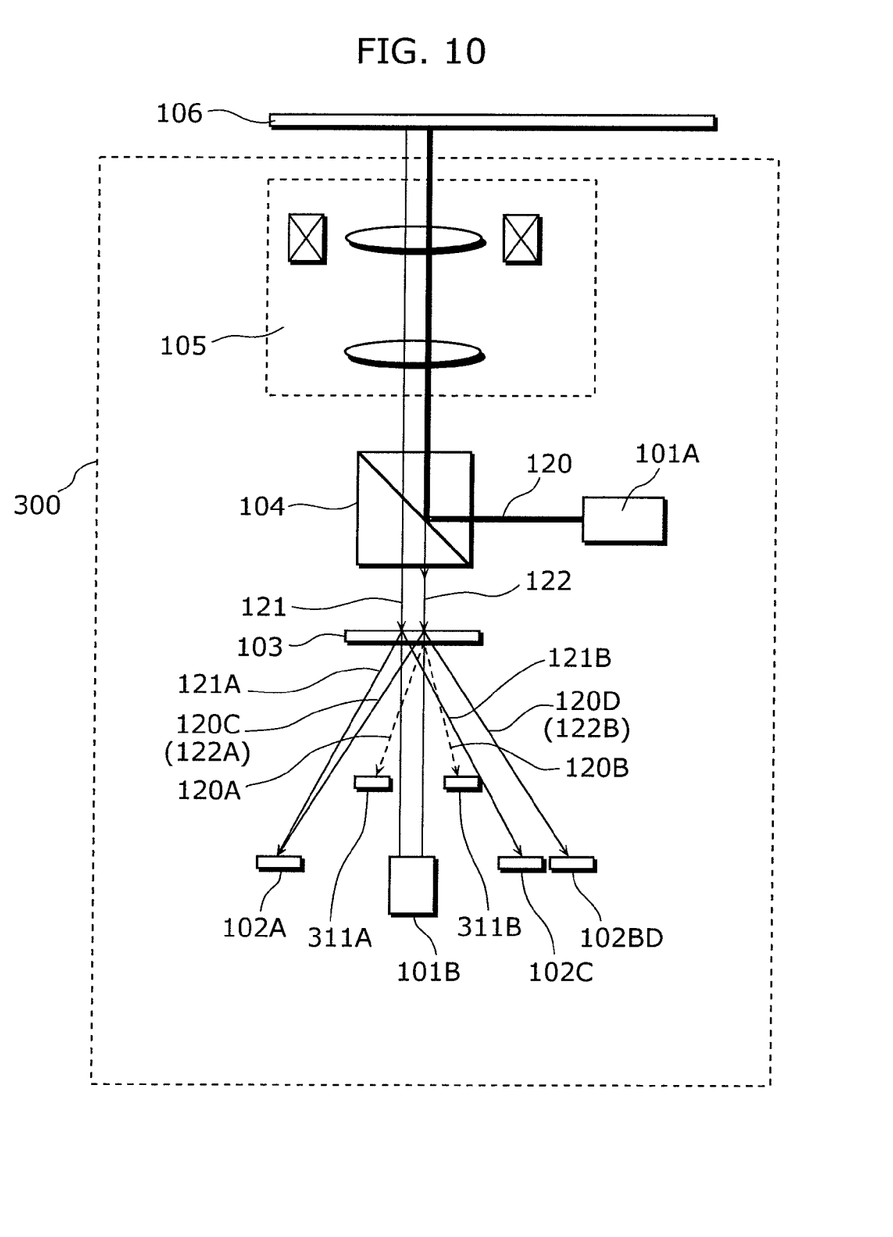
FIG. 10 is a diagram which shows the structure of the optical pickup device according to the third embodiment of the present invention.

FIG. 10 is a diagram which shows a conceptual structure of the optical pickup device according to the third embodiment of the present invention. Note that the same numbers are attached to the units as in FIG. 2 and a detailed description is not repeated.

The optical pickup device 300 according to FIG. 10 records, plays back and deletes information in the optical information storage medium 106. The optical pickup device 300 includes the light source 101A and 101B, the photo detectors 102A, 102BD and 102C, the diffraction element 103, the optical route combining unit 104, the collection unit 105 and stray light diffraction units 311A and 311B.

The stray light diffraction units 311A and 311B are formed between the diffraction element 103 and the photo detector 102. The stray light diffraction units 311A and 311B prevent irradiation in the direction of the photo detector 102 of the + first-order diffracted light 120A and the − first-order diffracted light 120B of the light at the first wavelength which are diffracted by the diffraction element 103. The stray light diffraction unit 311A is formed at the position at which + first-order diffracted light 120A of the light at the first wavelength enters. The stray light diffraction unit 311B is formed at the position at which − first-order diffracted light 120B of the light at the first wavelength enters. The stray light diffraction units 311A and 311B diffract the irradiated light. In other words, the stray light diffraction unit 311A is formed between the diffraction element 103 and the photo detector 102A and diffracts the + first-order diffracted light 120A of the light at the first wavelength diffracted by the diffraction element 103. The stray light diffraction unit 311B is formed between the diffraction element 103 and the photo detector 102C, and diffracts − first-order diffracted light 120B of the light at the first wavelength diffracted by the diffraction element 103. Note that when the stray light diffraction units 311A and 311B are not specifically differentiated, the stray light diffraction unit is described as the stray light diffraction unit 311. For example the stray light diffraction unit 311 is formed of diffraction elements.

It follows from the above that the optical pickup device 300 according to the third embodiment of the present invention includes a stray light diffraction unit 311. Thus, the generation of stray light within the substrate (a carrier generated by unnecessary light), which occurs when the + first-order diffracted light 120A and the − first-order diffracted light 120B of the light at the first wavelength, which are generated by the diffraction element 103 and not used as a signal light, enter the substrate formed by the photo detectors 102, can be reduced. Thus, the deterioration of the signal used in storage, playback and deletion by the optical information storage medium due to stray light can be stopped.

Additionally, the diffraction elements which make up the stray light diffraction unit 311 can be realized without using new methods, since the diffraction elements can be manufactured with the same process as the diffraction element 103.

Figure 11A:
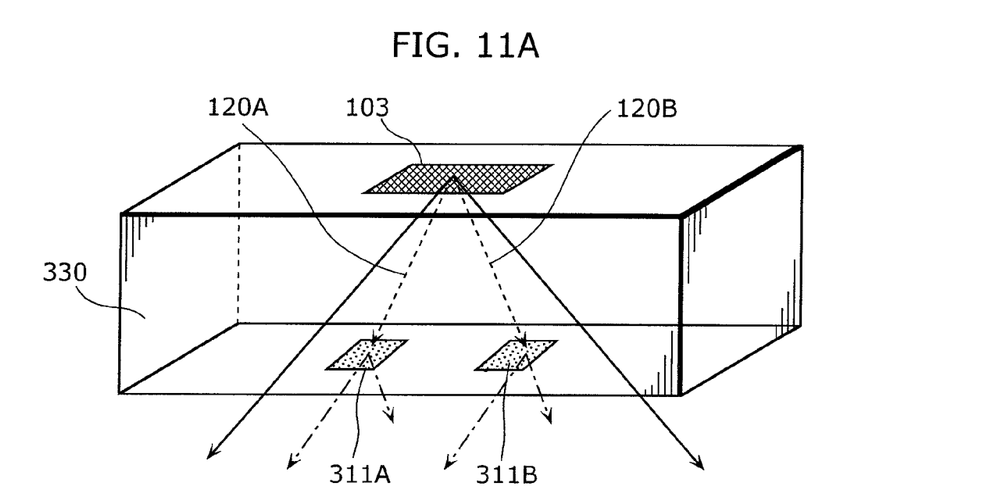
FIG. 11A is a diagonal view diagram which shows the structure of optical elements in the optical pickup device according to the third embodiment of the present invention.

FIG. 11A is a diagonal view diagram which shows the structure of the optical element 330 in which the diffraction element 103 and the stray light diffraction unit 311 are laid out on the top and bottom layer. As shown in FIG. 11A, the optical element 130 in which the diffraction element 103 and the stray light diffraction unit 311 are laid out on the top and bottom layers may be used. Thus, the amount of parts in the optical pickup device 300 can be reduced.

Figure 11B:
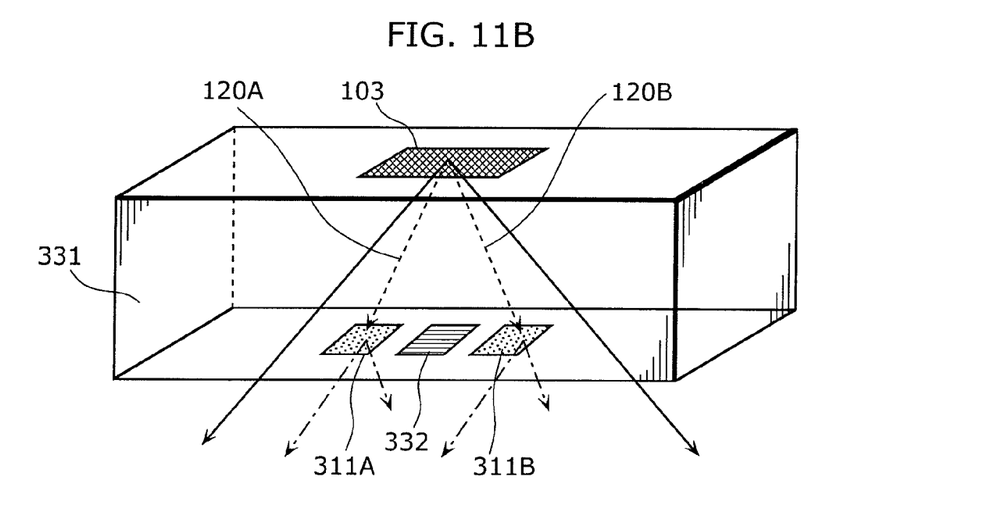
FIG. 11B is a diagonal view diagram which shows the modified structure of optical elements in the optical pickup device according to the third embodiment of the present invention.

Further, the diffraction element may be included between the stray light diffraction unit 311A and the stray light diffraction unit 311B. FIG. 11B is a diagonal view diagram which shows the structure of the optical element which includes the diffraction element between the stray light diffraction unit 311A and the stray light diffraction unit 311B. The optical element 331 shown in FIG. 11B further includes, in addition to the structure of the optical element 330 shown in FIG. 11A, a diffraction element 332. The diffraction element 332 generates a zero-order diffracted light and a ± first-order diffracted light of the light at the second wavelength 121 (wavelength 650 nm) and the light at the third wavelength 122 (wavelength 780 nm). For example, the zero-order diffracted light and the ± first-order diffracted light of the light at the second wavelength 121 and the light at the third wavelength 122 refracted by the refraction element 332 is irradiated onto the optical information storage medium 106. The reflected light (signal light) of the zero-order diffracted light and the ± first-order diffracted light of the light at the second wavelength 121 and the light at the third wavelength 122 reflected from the optical information storage medium 106 can be used as a tracking control signal. Thus, the three-beam push/pull method and the three-beam method which is a tracking servo in a DVD and a CD can be utilized.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to an optical pickup device, and in particular to an optical pickup device which records, plays back and deletes information on a BD (or an HD-DVD), a DVD and a CD.

What is claimed is:

1. An optical pickup device which performs at least one of writing information in and reading information out of an optical information storage medium, said optical pickup device comprising:

a light source which emits a first light at a first wavelength, a second light at a second wavelength and a third light at a third wavelength;

an optical path combining unit operable to combine vectors of the first, second and third light emitted by said light source, and to match optical axes of the first light and the third light;

a light collection unit operable to condense the light from said optical path combining unit into the optical information storage medium;

a first diffraction element operable to diffract reflected light of the first light reflected from the optical information storage medium into + first-order diffracted light, − first-order diffracted light, + second-order diffracted light and − second-order diffracted light, and to diffract reflected light of the second light reflected from the optical information storage medium into the + first-order diffracted light and the − first-order diffracted light, and to diffract reflected light of the third light reflected from the optical information storage medium into the + first-order diffracted light and the − first-order diffracted light;

a first photo detector which receives the +second-order diffracted light of the first light, the + first-order diffracted light of the second light and the + first-order diffracted light of the third light from said first diffraction element;

a second photo detector which receives the − second-order diffracted light of the first light and the − first-order diffracted light of the third light from said first diffraction element;

a third photo detector which receives the − first-order diffracted light of the second light from said first diffraction element; and a prevention unit formed between said first diffraction element and said first photo detector, said second photo detector and said third photo detector, and which prevents irradiation of the + first-order diffracted light and the − first-order diffracted light of the first light diffracted by said first diffraction element into said first photo detector, said second photo detector, and said third photo detector.

2. The optical pickup device according to claim 1, wherein said prevention unit includes:

a first stray light reflection unit formed between said first diffraction element and said first photo detector, and operable to reflect the + first-order diffracted light of the first light diffracted by said first diffraction element; and a second stray light reflection unit formed between said first diffraction element, and said second photo detector and said third photo detector, and operable to reflect the − first-order diffracted light of the first light diffracted by said first diffraction element.

3. The optical pickup device according to claim 2, wherein said first stray light reflection unit and said second stray light reflection unit are made up of Ti, Al, Au or Pt.

4. The optical pickup device according to claim 2, wherein said first stray light reflection unit and said second stray light reflection unit are made of SiO$_2$, TiO$_2$, SiN or MgF.

5. The optical pickup device according to claim 2, wherein said first stray light reflection unit, said second stray light reflection unit and said first diffraction element are laid out as a single optical element.

6. The optical pickup device according to claim 1, wherein said prevention unit includes:

a first stray light absorption unit formed between said first diffraction element and said first photo detector, and operable to absorb + first-order diffracted light of the first light diffracted by said diffraction element; and a second stray light absorption unit formed between said first diffraction unit, and said second photo detector and said third photo detector, and operable to absorb − first-order diffracted light of the first light diffracted by said first diffraction element.

7. The optical pickup device according to claim 6, wherein said first stray light absorption unit and said second stray light absorption unit are made of carbon black.

8. The optical pickup device according to claim 6, wherein said first stray light absorption unit, said second stray light absorption unit and said first diffraction element are laid out as one optical element.

9. The optical pickup device according to claim 1, wherein said prevention unit includes:

a second diffraction element formed between said first diffraction element and said first photo detector, and operable to diffract the + first-order diffracted light of the first light diffracted by said first diffraction element; and a third diffraction element formed between said first diffraction element, and said second photo detector and said third photo detector, and operable to diffract the − first-order diffracted light of the first light diffracted by said first diffraction element.

10. The optical pickup device according to claim 9, wherein said third diffraction element, said second diffraction element and said first diffraction element are laid out as a single optical element.

11. The optical pickup device according to claim 1, wherein the first light is blue light, the second light is red light and the third light is infrared light.

12. The optical pickup device according to claim 1, wherein said light source includes:

a first light source which emits the first light;

a second light source which emits the second and the third light, wherein said second light source, said first photo detector, said second photo detector and said third photo detector are formed on the same substrate.

13. The optical pickup device according to claim 1, wherein the cross-section structure of said first diffraction element is in a serrated shape.

14. The optical pickup device according to claim 1, wherein said optical combining unit is operable to combine vectors of the first light, the second light and the third light by causing the first light to reflect.

* * * * *